UNITED STATES PATENT OFFICE.

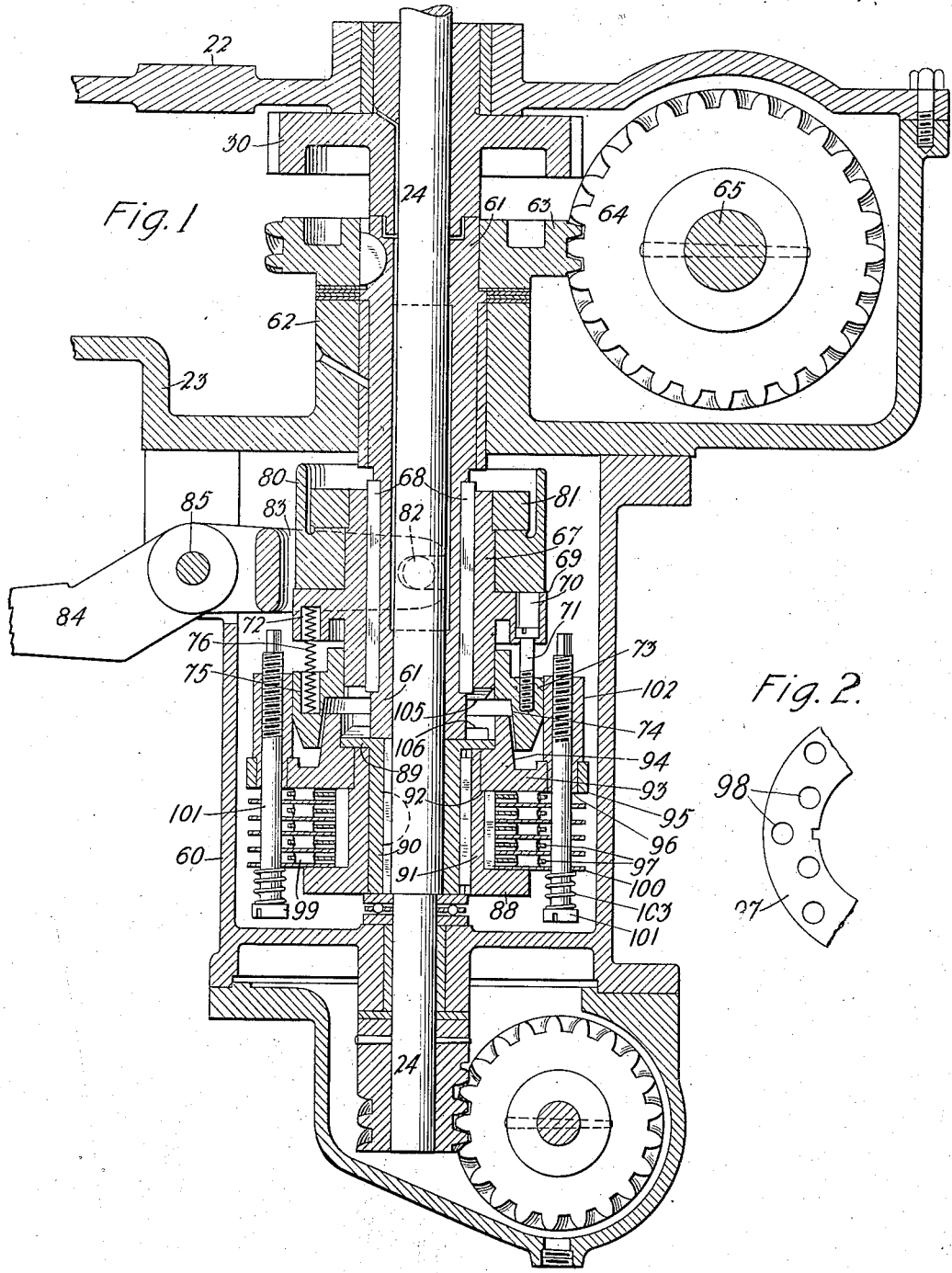

WILLIAM F. SMITH, OF BROOKLYN, NEW YORK, ASSIGNOR TO WESTERN ELECTRIC COMPANY, INCORPORATED, OF NEW YORK, N. Y., A CORPORATION OF NEW YORK.

POWER-TRANSMISSION SYSTEM.

1,250,687.  Specification of Letters Patent.  Patented Dec. 18, 1917.

Original application filed January 21, 1915, Serial No. 3,430. Divided and this application filed March 8, 1916. Serial No. 82,901.

*To all whom it may concern:*

Be it known that I, WILLIAM F. SMITH, a citizen of the United States, residing at Brooklyn, in the county of Kings and State of New York, have invented certain new and useful Improvements in Power-Transmission Systems, of which the following is a full, clear, concise, and exact description.

This invention relates to power transmission systems, and is a division of my copending application, Serial No. 3430, filed January 21, 1915, issued as Patent No. 1,182,591 of May 9, 1916.

It is an object of this invention to provide such a system in which a constantly rotating driving member may be operatively connected with a member to be driven in such manner that such member to be driven will be started at a low speed and gradually increased to normal or full speed.

In accordance with one feature of this invention, there is provided a pair of variable pressure clutch members and a pair of constant pressure clutch members interposed between, and adapted to operatively connect a constantly rotating driving member and a member to be driven together with means for causing engagement of the variable pressure clutch members, whereby the variable and constant pressure clutch members coöperate to control the speed of the driven member.

Other features of this invention relate to combinations of parts and details of construction as will hereinafter appear.

This invention is illustrated in the accompanying drawings in which the same reference characters are used throughout to designate the same parts, and in which—

Figure 1 is a view in section of a portion of a clutch device according to this invention, and Fig. 2 is a plan view of a portion of a flat annular friction disk.

The drawings show a power transmission system embodying this invention as applied to the machine which is described in Patent No. 1,182,591 of May 9, 1916, hereinbefore mentioned.

Secured to the main supporting frame 23 is a clutch housing 60, the lower end of which forms a bearing for the main shaft 24 carrying a gear 30 and extending upward through plate 22 and from which the various parts of the associated machine are driven. A hollow shaft 61, encircling the main shaft 24, extends down into the clutch housing 60, and is supported in a bearing 62 formed in the main supporting frame 23. To the upper end of the hollow shaft 61 is keyed a spiral gear 63, which meshes with a spiral gear 64 on a shaft 65 which may be assumed as being operated by any suitable driving means.

The hollow shaft 61 carries a clutch collar 67, which is attached thereto by means of feather keys 68, 68. The collar 67 is provided with a circular flange 69, in which there are three openings 70, 70—spaced 120° apart—for the reception of screws 71, 71. The flange 69 is also provided with three pockets 72, 72, spaced 120° apart, each being 60° from one of the openings 70, 70. A friction cone ring 73 having an inner cone face 74, is secured to the collar 67 by means of the screws 71, 71, and is adapted to move vertically with respect to the collar 67. This friction cone ring 73 is provided with three pockets 75, 75, spaced 120° apart, which are opposite the pockets 72, 72 provided in the flange 69, and coöperate therewith for the reception of cushioning springs 76, 76. A shifting collar 80 is secured to the clutch collar 67 by means of a clutch collar ring 81, and is provided upon opposite sides thereof with projecting pins 82, 82 (only one of which is shown), each of which is engaged by one of the forked ends 83, 83 of a clutch lever 84 which is pivoted to the clutch housing 60 at 85. Immediately below the hollow shaft 61, a bushing 90 is keyed to the main shaft 24. A sleeve 91 is keyed to the bushing 90 and is provided with a shoulder 92, upon which rests a friction cone ring 93 adapted to rotate independently of the sleeve 91. Vertical movement of the friction cone ring 93 is prevented by the shoulder 92 on the sleeve 91 and by a circular flange 89 provided on the bushing 90. The friction cone ring 93 is provided with a cone face 94, adapted for frictional engagement with the cone face 74 of the friction cone ring 73 and to be rotated thereby. A circular flange 95 on the ring 93 is provided with openings 96 spaced at 60°. In order that motion may be transmitted from the friction cone ring 93, to the main shaft 24, there are keyed to the sleeve 91 a plurality of flat annular friction disks 97, each provided with a number of openings 98 for the reception of short cylinders or inserts 99 of cork, wood, leather, fiber, felt or some other similar material. The short cork cylinders 99 have frictional engagement with flat annular friction disks 100, which alternate with the disks 97, and which are secured to the friction cone ring 93 by means of six screws 101 passing through openings in the disks 100 and through the openings 96 in the friction cone ring 93, and having engagement with bushings 102 seated in the openings 96. A circular flange 88, formed on the lower part of the sleeve 91, coöperates with the flange 95 of the cone ring 93 to maintain the friction disks 97, 97 and 100, 100 in proper position with only a minimum amount of pressure between the cork inserts 99, 99 and the disks 100, 100. Between the head of each screw 101 and the lower friction disk 100 there is a tension spring 103 which controls the degree of friction between the ring disks 100 and 97. Movement of the screws 101 adjusts the tension of the springs 103 and consequently, the degree of friction between the ring disks.

The tension of the springs 103, 103 is adjusted so that the friction between the disks 100, 100, and the cork inserts 99, 99, is greater than the friction between the cone faces 74 and 94 of the cone rings 73, and 93 respectively, when there is a great amount of slip between these cone faces, as at starting, but less than the friction between the cone faces when there is little or no slip between these cone faces. It will be readily apparent therefore that should the cones become jammed when setting, slipping takes place between the disks 100, 100 and the cork inserts 99, 99. Such an arrangement insures that the main shaft 24 will, under all circumstances, be started at low speed. It is also to be noted that the adjustment of the tension between the disks and the cork inserts is such that, when carrying the full load, some slipping will take place between the disks and the cork inserts.

When the outer end of the clutch lever 84 is raised, the forked extremities 83, 83 of the forward end thereof, engaging the pins 82, 82 move the clutch collar 67 downward, which, through the cushioning springs 76, 76 moves the cone ring 73 downward to cause light frictional engagement between its cone face 74 and the cone face 94 of the cone ring 93. Motion is then transmitted from the cone ring 73 to cone ring 93, which in its turn transmits motion to the main shaft 24 through the frictional engagement of the disks 100, 100 carried by the cone ring 93, and the cork inserts 99, 99, of the disks 97, 97 carried by the main shaft 24. As the friction between the cone rings 73 and 93 increases, due to further raising of the outer end of the clutch lever 84, the speed of the main shaft 24 increases. The cone ring 73 has only a limited vertical movement. The cushioning springs 76, 76 serve to prevent to a degree the jamming of the cone rings 73 and 93, and the friction disks 97 and 100 act to prevent the sudden increase in speed of the main shaft 24 should the cone rings 73 and 93 jam when starting the machine. The clutch collar 67 has considerably more vertical movement than the cone ring 73, with the result that when the main shaft 24 has been started, and its speed gradually increased, the downward movement of the clutch collar 67 may continue until teeth 105, 105 provided on the lower end thereof, engage with teeth 106, 106 provided on the upper face of the flange 89 of the bushing 90, whereby the friction cone rings 73 and 93 and the friction disks 97, 97, and 100, 100 are entirely eliminated from the transmission system, and the main shaft 24 is driven direct from the hollow shaft 61 through only the clutch collar 67 and the bushing 90.

Any suitable means, such as that described in my Patent No. 1,182,591, hereinbefore referred to, may be employed for raising or lowering the outer end of clutch lever 84 for respectively starting or stopping the rotation of the main shaft 24. Due to the fact that the downward movement of the cone ring 73 is transmitted from the clutch collar 67, through the compression springs 76, 76, the probability of jamming the friction cone rings 73 and 93 by a sudden raising of the outer end of clutch lever 84 is considerably reduced. However, should the outer end of the clutch lever be raised too fast, resulting in a great amount of friction between the cone rings 73 and 93, slipping takes place between the disks 100, 100, and the cork inserts 99, 99, carried by the disks 97, 97, whereby the main shaft 24 is prevented from starting at full speed.

In order to stop the rotation of the main shaft 24, it is only necessary to so operate the above mentioned means that the outer end of clutch lever 84 is lowered and thereby causes the disengagement of the teeth 105, 105, and 106, 106, and of the friction cone rings 73 and 93.

In machines for winding insulating material about wires, it is of the utmost importance that the winding head which winds the insulating material about the wire be started at very low speed and gradually increased to normal or full speed, in order to prevent the breaking of the insulating material. The power transmission systems heretofore used in such machines have permitted the winding head to be started suddenly and at such speeds as cause a great amount of breakage of the insulating material. By the use of a power transmission system embodying this invention, the difficulties heretofore experienced are overcome and the desired results accomplished.

What is claimed is:

1. In a power transmission system, the combination of a driving member, a member to be driven, a pair of variable pressure clutch members and a pair of constant pressure clutch members interposed between and adapted to operatively connect said driving member and said driven member, and means for causing engagement of said variable pressure clutch members whereby said variable and said constant pressure clutch members coöperate to control the motion transmitted from said driving to said driven member.

2. In a power transmission system, the combination of a driving member, a member to be driven, a pair of variable pressure clutch members and a pair of constant pressure clutch members interposed between and adapted to operatively connect said driving and said driven members, means for causing engagement of said variable pressure clutch members, whereby said variable and said constant pressure clutch members coöperate to start said driven member at low speed and to gradually increase the speed thereof, and normally disengaged means carried by said driving and said driven members for directly connecting said members and eliminating said clutch members, the engagement of said second mentioned means occurring subsequent to the speeding up of said driven member.

3. In a power transmission system, the combination of a driving member, a member to be driven, a pair of normally disengaged variable pressure clutch members, one of which is carried by said driving member, a pair of constant pressure clutch members, one of which is carried by said driven member, the other being carried by the other of said variable pressure clutch members, and means for causing engagement of said variable pressure clutch members whereby said variable and said constant pressure clutch members coöperate to start said driven member at low speed.

4. In a power transmission system, the combination of a driving member, a friction cone operatively connected thereto, a member to be driven, a set of friction disks operatively connected thereto, a second friction cone adapted to be engaged by the said first friction cone, a set of friction disks operatively connected to said second friction cone, a plurality of cork inserts mounted in each disk of one set and engaging under constant pressure disks of said other set, a toothed member mounted on said driving member, a toothed member mounted on said driven member and adapted to be engaged by said other toothed member, and means for causing engagement of said friction cones whereby said cones coöperate with said disks to start said driven member at low speed and to gradually increase the speed thereof, and for thereafter causing engagement of said toothed members whereby said friction cones and disks are eliminated.

In witness whereof, I hereunto subscribe my name this 7th day of March, A. D. 1916.

WILLIAM F. SMITH.